US010851258B2

(12) United States Patent
Li et al.

(10) Patent No.: US 10,851,258 B2
(45) Date of Patent: Dec. 1, 2020

(54) STABILIZED MOISTURE-CURABLE POLYMERIC COMPOSITIONS

(71) Applicant: Dow Global Technologies LLC, Midland, MI (US)

(72) Inventors: Dachao Li, Royersford, PA (US); Jessica D. Drazba, Los Gatos, CA (US); Manish Talreja, Lansdale, PA (US); Jeffrey M. Cogen, Flemington, NJ (US); Timothy J. Person, Pottstown, PA (US); Paul J. Caronia, Annadale, NJ (US)

(73) Assignee: Dow Global Technologies LLC, Midland, MI (US)

( * ) Notice: Subject to any disclaimer, the term of this patent is extended or adjusted under 35 U.S.C. 154(b) by 73 days.

(21) Appl. No.: 15/781,732

(22) PCT Filed: Nov. 30, 2016

(86) PCT No.: PCT/US2016/064118
§ 371 (c)(1),
(2) Date: Jun. 6, 2018

(87) PCT Pub. No.: WO2017/100049
PCT Pub. Date: Jun. 15, 2017

(65) Prior Publication Data
US 2018/0362793 A1 Dec. 20, 2018

Related U.S. Application Data

(60) Provisional application No. 62/264,897, filed on Dec. 9, 2015.

(51) Int. Cl.
| | | |
|---|---|---|
| *C09D 123/08* | (2006.01) | |
| *C08K 5/375* | (2006.01) | |
| *C08K 5/5419* | (2006.01) | |
| *C09D 7/63* | (2018.01) | |
| *C08J 3/24* | (2006.01) | |
| *C09D 5/00* | (2006.01) | |
| *H01B 3/44* | (2006.01) | |
| *C08K 5/372* | (2006.01) | |
| *C08K 5/13* | (2006.01) | |

(52) U.S. Cl.
CPC .......... *C09D 123/0892* (2013.01); *C08J 3/24* (2013.01); *C08K 5/375* (2013.01); *C08K 5/5419* (2013.01); *C09D 5/00* (2013.01); *C09D 7/63* (2018.01); *H01B 3/441* (2013.01); *C08J 2323/08* (2013.01); *C08K 5/13* (2013.01); *C08K 5/372* (2013.01)

(58) Field of Classification Search
CPC .... H01B 3/441; C09D 5/00; C09D 123/0815; C08K 5/372; C08K 5/375; C08K 5/5419; C08K 5/13; C08K 5/005; C08K 5/42; C08K 5/10; C08K 5/36; C08K 5/549; C08K 5/1345; C08K 5/3462; C08K 5/54; C08J 2323/08; C08J 3/24; C08J 2323/06; C08J 2323/10; C08L 51/06; C08L 23/04; C08L 23/10; C08L 23/06; C08L 23/12; C08L 23/08; C08L 23/0815; C08L 51/086; C08L 2312/08; C08L 2312/00; C08L 83/04; Y10T 428/2962; Y10T 428/2938; Y10T 428/2933; C08G 77/14; C08F 10/02; C08F 110/02; C08F 283/12
USPC .......... 427/117, 118; 524/331; 428/394, 375, 428/378, 391; 174/110 SR, 110 R, 174/110 PM, 23 C; 525/342
See application file for complete search history.

(56) References Cited

U.S. PATENT DOCUMENTS

| | | | |
|---|---|---|---|
| 4,857,600 A | 8/1989 | Gross et al. | |
| 5,246,783 A | 9/1993 | Spenadel et al. | |
| 5,266,627 A | 11/1993 | Meverden et al. | |
| 5,575,965 A | 11/1996 | Caronia et al. | |
| 6,496,629 B2 | 12/2002 | Ma et al. | |
| 6,714,707 B2 | 3/2004 | Rossi et al. | |
| 7,781,557 B2 | 8/2010 | Fagrell et al. | |
| 8,324,311 B2 | 12/2012 | Wasserman et al. | |
| 8,460,770 B2 | 6/2013 | Chaudhary et al. | |
| 8,541,491 B2 | 9/2013 | Wasserman et al. | |
| 2007/0155866 A1* | 7/2007 | Biscoglio | C08F 255/00 524/86 |
| 2011/0171570 A1 | 7/2011 | Takimoto et al. | |
| 2012/0273253 A1* | 11/2012 | Nilsson | C08F 6/001 174/120 SC |

FOREIGN PATENT DOCUMENTS

| | | |
|---|---|---|
| CN | 104804301 | 7/2015 |
| EP | 1254923 B1 | 8/2006 |
| EP | 1433811 B1 | 2/2007 |
| EP | 2170986 B1 | 6/2011 |

(Continued)

OTHER PUBLICATIONS

Tracton, Arthur A., "Coating Materials and Surface Coatings," 2007, CRC Press, Boca Raton, FL.

*Primary Examiner* — Camie S Thompson

(57) ABSTRACT

Silane-crosslinkable polymeric compositions comprising a polyolefin having hydrolyzable silane groups, an acidic silanol condensation catalyst, and a phenolic antioxidant. The phenolic antioxidant comprises two sulfur-containing radicals, one located at the ortho position and the other located at the para position relative to the hydroxyl group of the phenol. Such crosslink able polymeric compositions can be employed in various articles of manufacture, such as in the wire and cable industry.

9 Claims, No Drawings

(56) References Cited

FOREIGN PATENT DOCUMENTS

| | | |
|---|---|---|
| EP | 2195380 B1 | 4/2012 |
| WO | 2005003199 | 1/2005 |
| WO | 2006101754 | 9/2006 |
| WO | 2015200015 | 12/2015 |
| WO | 2015200016 | 12/2015 |

* cited by examiner

STABILIZED MOISTURE-CURABLE POLYMERIC COMPOSITIONS

FIELD

Various embodiments of the present invention relate to moisture-curable polymeric compositions containing an acidic silanol condensation catalyst and stabilized with a phenolic antioxidant.

INTRODUCTION

Silane-crosslinkable polymers, and compositions comprising these polymers, are known in the art. Polyolefins (e.g., polyethylene) are typically used as the polymer in such compositions, into which one or more unsaturated silane compounds (e.g., vinyl trimethoxysilane, vinyl triethoxysilane, vinyl dimethoxyethoxysilane, etc.) have been incorporated. The polymer is then crosslinked upon exposure to moisture, typically in the presence of a catalyst. Such crosslinked polymers have found uses in various industries, particularly as insulation coatings in the wire and cable industry. Although advances have been made in the field of silane-crosslinkable polymers, improvements are still desired.

SUMMARY

One embodiment is a silane-crosslinkable polymeric composition, comprising:
a polyolefin having hydrolyzable silane groups;
an acidic silanol condensation catalyst; and
a phenolic antioxidant having the following structure:

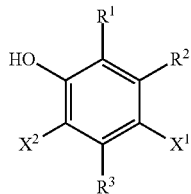

wherein $X^1$ and $X^2$ are individual sulfur-containing radicals,
wherein $R^1$, $R^2$, and $R^3$ are individually hydrogen atoms or hydrocarbyl radicals optionally containing one or more heteroatoms.

DETAILED DESCRIPTION

Various embodiments of the present invention concern silane-crosslinkable polymeric compositions comprising a polyolefin having hydrolyzable silane groups, an acidic silanol condensation catalyst, and a phenolic antioxidant. In various embodiments, the silane-crosslinkable polymeric composition can further comprise an ester-functionalized thioether. Further embodiments concern crosslinked polymeric compositions made from such crosslinkable polymeric compositions, methods for making such crosslinked polymeric compositions, and articles of manufacture comprising such crosslinked polymeric compositions.

Polyolefin

As just noted, the silane-crosslinkable polymeric compositions described herein comprise a polyolefin having hydrolyzable silane groups. The polyolefin having hydrolyzable silane groups includes silane-functionalized olefinic polymers, such as silane-functionalized polyethylene, polypropylene, etc., and various blends of these polymers. In one or more embodiments, the silane-functionalized olefinic polymers can be selected from the group consisting of (i) an interpolymer of ethylene and a hydrolyzable silane, (ii) an interpolymer of ethylene, one or more $C_3$ or higher α-olefins and/or unsaturated esters, and a hydrolyzable silane, (iii) a homopolymer of ethylene having a hydrolyzable silane grafted to its backbone, and (iv) an interpolymer of ethylene and one or more $C_3$ or higher α-olefins and/or unsaturated esters, the interpolymer having a hydrolyzable silane grafted to its backbone. Exemplary α-olefins include propylene, 1-butene, 1-hexene, 4-methyl-1-pentene and 1-octene. Exemplary unsaturated esters are vinyl acetate or an acrylic or methacrylic ester.

Polyethylene, as used herein, is a homopolymer of ethylene or an interpolymer of ethylene and a minor amount (i.e., less than 50 mole percent ("mol %")) of one or more α-olefins and/or unsaturated esters having from 3 to 20 carbon atoms, or from 4 to 12 carbon atoms, and, optionally, a diene. Polyethylenes can also be a mixture or blend of such homopolymers and interpolymers. When a mixture is used, the mixture can be either an in situ blend or a post-reactor (e.g., mechanical) blend.

The polyethylene can be homogeneous or heterogeneous. Homogeneous polyethylenes typically have a polydispersity (Mw/Mn) of about 1.5 to about 3.5, an essentially uniform comonomer distribution, and a single, relatively low melting point as measured by differential scanning calorimetry. The heterogeneous polyethylenes typically have a polydispersity greater than 3.5 and lack a uniform comonomer distribution. Mw is weight-average molecular weight, and Mn is number-average molecular weight.

Polyolefins (e.g., polyethylenes) suitable for use herein can have a density in the range of from 0.850 to 0.970 g/cm³, or from 0.870 to 0.930 g/cm³. Polymer densities provided herein are determined according to ASTM International ("ASTM") method D792. In various embodiments, the polyolefins (e.g., polyethylenes) can have a melt index ($I_2$) in the range of from 0.01 to 2000, from 0.05 to 1000, or from 0.10 to 50 g/10 min Melt indices provided herein are determined according to ASTM method D1238. Unless otherwise noted, melt indices are determined at 190° C. and 2.16 Kg (a.k.a., $I_2$). If a polyethylene homopolymer is employed, then its $I_2$ can be from 0.1 to 10 g/10 min.

Polyethylenes used in the practice of this invention can be prepared by any known or hereafter discovered process (such as high-pressure, solution, slurry, or gas-phase) using any conventional or hereafter discovered conditions and techniques. Catalyst systems include Ziegler-Natta, Phillips, and the various single-site catalysts (e.g., metallocene, constrained geometry, etc.). The catalysts can be used with or without supports.

Useful polyethylenes include low density homopolymers of ethylene made by high-pressure processes (HP-LDPEs), linear low-density polyethylenes (LLDPEs), very-low-density polyethylenes (VLDPEs), ultra-low-density polyethylenes (ULDPEs), medium-density polyethylenes (MDPEs), high-density polyethylene (HDPE), and metallocene and constrained-geometry copolymers.

High-pressure processes are typically free-radical-initiated polymerizations and conducted in a tubular reactor or a stirred autoclave. In a tubular reactor, the pressure can be in the range of from 25,000 to 45,000 psi, and the temperature can be in the range of from 200 to 350° C. In a stirred autoclave, the pressure can be in the range of from 10,000 to 30,000 psi, and the temperature can be in the range of from 175 to 250° C.

Interpolymers comprised of ethylene and unsaturated esters are well known and can be prepared by conventional high-pressure techniques. In various embodiments, the unsaturated esters can be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. The portion of the interpolymer attributed to the ester comonomer can be in the range of from 5 to less than 50 weight percent ("wt %") based on the weight of the interpolymer, or in the range of 15 to 40 wt %.

Examples of acrylates and methacrylates include, but are not limited to, ethyl acrylate, methyl acrylate, methyl methacrylate, t-butyl acrylate, n-butyl acrylate, n-butyl methacrylate, and 2-ethylhexyl acrylate. Examples of vinyl carboxylates include, but are not limited to, vinyl acetate, vinyl propionate, and vinyl butanoate. The melt index of ethylene/unsaturated ester interpolymers can be in the range of from 0.5 to 50 g/10 min, or in the range of from 2 to 25 g/10 min.

VLDPEs and ULDPEs are typically copolymers of ethylene and one or more α-olefins having 3 to 12 carbon atoms, or 3 to 8 carbon atoms. The density of the VLDPE or ULDPE can be in the range of from 0.870 to 0.915 g/cm³. The melt index of the VLDPE or ULDPE can be in the range of from 0.1 to 20 g/10 min, or from 0.3 to 5 g/10 min. The portion of the VLDPE or ULDPE attributed to the comonomer(s), other than ethylene, can be in the range of from 1 to 49 wt % based on the weight of the copolymer, or from 15 to 40 wt %.

A third comonomer can be included, e.g., another α-olefin or a diene such as ethylidene norbornene, butadiene, 1,4-hexadiene or a dicyclopentadiene. Ethylene/propylene copolymers are generally referred to as EPRs, and ethylene/propylene/diene terpolymers are generally referred to as EPDMs. The third comonomer can be present in an amount of from 1 to 15 wt % based on the weight of the interpolymer, or from 1 to 10 wt %. In various embodiments, the interpolymer can contain two or three monomer types, inclusive of ethylene.

The LLDPE can include VLDPE, ULDPE, and MDPE, which are also linear, but, generally, have a density in the range of from 0.916 to 0.925 g/cm³. The LLDPE can be a copolymer of ethylene and one or more α-olefins having from 3 to 12 carbon atoms, or from 3 to 8 carbon atoms. The melt index can be in the range of from 1 to 20 g/10 min, or from 3 to 8 g/10 min.

Any polypropylene may be used in silane-crosslinkable polymeric compositions. Examples include homopolymers of propylene, copolymers of propylene and other olefins, and terpolymers of propylene, ethylene, and dienes (e.g. norbornadiene and decadiene). Additionally, the polypropylenes may be dispersed or blended with other polymers, such as EPR or EPDM. Suitable polypropylenes include thermoplastic elastomers (TPEs), thermoplastic olefins (TPOs) and thermoplastic vulcanates (TPVs). Examples of polypropylenes are described in *Polypropylene Handbook: Polymerization, Characterization, Properties, Processing, Applications*, 3-14, 113-176 (E. Moore, Jr. ed., 1996).

Hydrolyzable silane monomers suitable for use in forming the silane-functionalized polyolefin can be any hydrolyzable silane monomer that will effectively copolymerize with an olefin (e.g., ethylene), or graft to an olefin polymer (e.g., polyethylene). Those described by the following formula are exemplary:

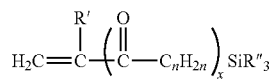

in which R' is a hydrogen atom or methyl group; x is 0 or 1; n is an integer from 1 to 12 inclusive, preferably 1 to 4, and each R" independently is a hydrolyzable organic group such as an alkoxy group having from 1 to 12 carbon atoms (e.g. methoxy, ethoxy, butoxy), an aryloxy group (e.g. phenoxy), an araloxy group (e.g. benzyloxy), an aliphatic acyloxy group having from 1 to 12 carbon atoms (e.g. formyloxy, acetyloxy, propanoyloxy), an amino or substituted amino group (alkylamino, arylamino), or a lower-alkyl group having 1 to 6 carbon atoms inclusive, with the proviso that not more than two of the three R" groups are an alkyl. Such silanes may be copolymerized with an olefin (e.g., ethylene) in a reactor, such as a high-pressure process. Such silanes may also be grafted to a suitable olefin polymer (e.g., polyethylene) by the use of a suitable quantity of organic peroxide.

In various embodiments, suitable silanes include unsaturated silanes that comprise an ethylenically unsaturated hydrocarbyl group, such as a vinyl, allyl, isopropenyl, butenyl, cyclohexenyl or gamma (meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. In one or more embodiments, the silanes can be unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Specific examples of hydrolyzable silane monomers include, but are not limited to, vinyltrimethoxysilane ("VTMS"), vinyltriethoxysilane ("VTES"), vinyltriacetoxysilane, and gamma-(meth)acryloxy propyl trimethoxy silane.

Incorporation of the hydrolyzable silane group in the polyolefin can be accomplished using any known or hereafter discovered copolymerization or grafting techniques. By way of example, the hydrolyzable silane monomer can be grafted onto a polyolefin by combining a polyolefin with an unsaturated alkoxysilane (e.g., vinyltrimethoxysilane) and a peroxide (e.g., an organic peroxide, such as dicumyl peroxide ("DCP")). After mixing for a period of time (e.g., 1-30 minutes), the mixture can be extruded at elevated and increasing temperatures (e.g., from 160° C. to 220° C.).

Whether copolymerizing or grafting, the amount of unsaturated hydrolyzable silane monomer employed in the reaction can range from 0.5 to 10 wt %, from 1 to 5 wt %, or from 1 to 3 wt % based on the combined weight of the polyolefin and the unsaturated hydrolyzable silane monomer. In an embodiment, the hydrolyzable silane group can be melt-blended with the polyolefin, peroxide, and other ingredients in one step as part of the cable extrusion process, without a need to first prepare a compound or grafted polyolefin prior to use during cable extrusion.

An example of a commercially available polyolefin having hydrolyzable silane groups is SI-LINK™ DFDA-5451, which is ethylene copolymerized with 1.5 wt % vinyltrimethoxysilane prepared using a high-pressure reactor, and is available from The Dow Chemical Co., Midland, Mich., USA.

The polyolefin can also comprise blends of silane-functionalized olefinic polymer with one or more other polyolefins that are not silane functionalized.

In various embodiments, the polyolefin having hydrolyzable silane groups can be present in the crosslinkable polymeric composition in an amount of at least 30 wt %, at least 40 wt % at least 50 wt %, at least 70 wt %, at least 90 wt %, or at least 94 wt %, based on the total weight of the silane-crosslinkable polymeric composition. In some embodiments, the polyolefin having hydrolyzable silane groups can be present in an amount ranging from 40 to 99.9 wt %, from 50 to 99.9 wt %, from 70 to 99.9 wt %, from 90 to 99.9 wt %, or from 94 to 99.9 wt %, based on the total weight of the silane-crosslinkable polymeric composition.

Silanol Condensation Catalyst

As noted above, the silane-crosslinkable polymeric composition further comprises an acidic silanol condensation catalyst. The silanol condensation catalyst can be any known or hereafter discovered acidic compound that acts as a moisture-cure catalyst, including Lewis and Brønsted acids.

Lewis acids are chemical species (molecule or ion) that can accept an electron pair from a Lewis base. Lewis bases are chemical species (molecule or ion) that can donate an electron pair to a Lewis acid. Lewis acids that can be used in the practice of this invention include tin carboxylates, such as dibutyl tin dilaurate ("DBTDL"), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate.

Brønsted acids are chemical species (molecule or ion) that can lose or donate a hydrogen ion (proton) to a Brønsted base. Brønsted bases are chemical species (molecule or ion) that can gain or accept a hydrogen ion from a Brønsted acid. In various embodiments, the silanol condensation catalyst can be a Brønsted acid. Examples of suitable Brønsted acid silanol condensation catalysts include, but are not limited to, monosulfonic acids and disulfonic acids. Sulfonic acids are organic acids that contain one or more sulfonic (i.e., —$SO_3H$) groups, and have the general formula $RS(=O)_2$—OH, where R is an organic alkyl or aryl or substituted aryl group and the $S(=O)_2$—OH group is a sulfonyl hydroxide. Sulfonic acids can be aliphatic or aromatic and differ significantly in melting points. Examples of aromatic sulfonic acids are benzene sulfonic acid, alkyl benzene sulfonic acid, alkyl ethyl benzene sulfonic acid, alkyl toluene sulfonic acid, dodecylbenzenesulfonic acid, 4-methylbenzene sulfonic acid (also known as p-toluenesulfonic acid), alkyl xylene sulfonic acid, naphthalene sulfonic acid, alkyl napthalene sulfonic acid, and blocked sulfonic acids. Sulfonic acids include the silanol condensation catalysts disclosed in U.S. Pat. No. 8,460,770 B2.

In an embodiment, the silanol condensation catalyst can be a blocked sulfonic acid. Blocked sulfonic acids can be amine-blocked (which are ionic, charged species) or covalently-blocked (through reactions with alcohols, epoxies or functional polymers). Blocked sulfonic acids dissociate at elevated temperatures by hydrolysis, alcoholysis or decomposition reactions to generate free acids. More information on blocked sulfonic acids is presented in "Coatings Materials and Surface Coatings" (CRC Press, Nov. 7, 2006; edited by Arthur A. Tracton) and "Handbook of Coating Additives" (CRC Press, May 26, 2004; edited by John J. Florio, Daniel J. Miller). The NACURE™ materials (all products of King Industries) disclosed in US Patent Application Publication No. 2011/0171570 are examples of blocked sulfonic acids with varying dissociation temperatures. Examples of commercially available blocked sulfonic acids include NACURE™ 1419 (product of King Industries), which is a 30% solution of covalently-blocked dinonylnaphthalenesulfonic acid in xylene/4-methyl-2-pentanone, and NACURE™ 5414 (product of King Industries), which is a 25% solution of covalently-blocked dodecylbenzenesulfonic acid in xylene.

In various embodiments, a combination of two or more acidic silanol condensation catalysts may be employed. In one or more embodiments, the acidic silanol condensation catalyst can be selected from the group consisting of alkyl aromatic sulfonic acids, hydrolyzable precursors of alkyl aromatic sulfonic acids, organic phosphonic acids, hydrolyzable precursors of organic phosphonic acids, halogen acids, and mixtures of two or more thereof. In an embodiment, the acidic silanol condensation catalyst comprises an alkyl aromatic sulfonic acid. Examples of commercially available alkyl aromatic sulfonic acids include NACURE™ CD-2180 and NACURE™ B201 (available from King Industries, Norwalk, Conn., USA), and ARISTONIC™ Acid 9900 (available from Pilot Chemical Company, Cincinnati, Ohio, USA).

The silanol condensation catalyst can be present in an amount of at least 0.01 wt %, at least 0.05 wt %, or at least 0.1 wt % based on the entire weight of the silane-crosslinkable polymeric composition. In some embodiments, the silanol condensation catalyst can be present in an amount ranging from 0.01 to 0.5 wt %, from 0.05 to 0.3 wt %, or from 0.1 to 0.2 wt % based on the entire weight of the silane-crosslinkable polymeric composition.

Phenolic Antioxidant

As noted above, the silane-crosslinkable polymeric composition further comprises a phenolic antioxidant. The phenolic antioxidant suitable for use herein can have the following structure:

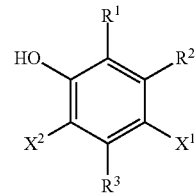

where $X^1$ and $X^2$ are individual sulfur-containing radicals and $R^1$, $R^2$, and $R^3$ are individually hydrogen or a hydrocarbyl radical, optionally containing one or more heteroatoms. In various embodiments, each of $R^1$, $R^2$, and $R^3$ can individually be hydrogen or a $C_1$ to $C_8$ (i.e., having from 1 to 8 carbon atoms), $C_1$ to $C_6$, $C_1$ to $C_4$, or $C_1$ to $C_2$ aliphatic moiety. In various embodiments, when $R^1$, $R^2$, and $R^3$ have more than two carbon atoms, each group individually may optionally contain no tertiary or quaternary carbon atoms. In an embodiment, none of $R^1$, $R^2$, and $R^3$ contains any tertiary or quaternary carbon atoms. In further embodiments $R^1$, $R^2$, and $R^3$ can individually be hydrogen or a $C_1$ to $C_4$, or $C_1$ to $C_2$ straight-chain alkyl group. In still further embodiments, each of $R^1$, $R^2$, and $R^3$ can be a hydrogen or methyl group. In various embodiments, $X^1$ and $X^2$ can be individual aliphatic radicals containing one or more sulfur atoms. In additional embodiments $X^1$ and $X^2$ can be individual straight-chain $C_1$ to $C_{20}$, $C_2$ to $C_{16}$, or $C_4$ to $C_{12}$ aliphatic radicals containing one or more sulfur atoms either pendant to or incorporated in the backbone of the aliphatic chain.

In one or more further embodiments, the phenolic antioxidant can have the following structure:

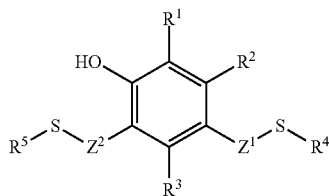

where $R^1$, $R^2$, and $R^3$ are individually hydrogen or a $C_1$ to $C_4$, or $C_1$ to $C_2$ straight-chain alkyl group; $Z^1$ and $Z^2$ are optionally present, and when present can individually be any divalent hydrocarbyl radicals; and $R^4$ and $R^5$ can be individual hydrocarbyl radicals optionally containing one or more heteroatoms. In various embodiments, $Z^1$ and $Z^2$ can individually be any divalent $C_1$ to $C_{10}$, $C_1$ to $C_4$, or $C_1$ to $C_2$ aliphatic group. In an embodiment, $Z^1$ and $Z^2$ can individually be selected from $C_1$ to $C_{10}$, $C_1$ to $C_4$, or $C_1$ to $C_2$ alkylene groups. Suitable alkylene groups include, but are not limited to, methylene, ethylene, propylene, and butylene groups. In an embodiment, both $Z^1$ and $Z^2$ are methylene groups. In various embodiments, $R^4$ and $R^5$ can be individual straight-chain $C_1$ to $C_{20}$, $C_2$ to $C_{16}$, or $C_4$ to $C_{12}$ aliphatic moieties.

In still further embodiments, the phenolic antioxidant can have the following structure:

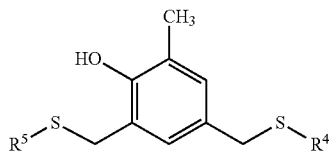

where $R^4$ and $R^5$ are individually selected from straight-chain $C_1$ to $C_{20}$, $C_2$ to $C_{16}$, or $C_4$ to $C_{12}$ aliphatic moieties. In an embodiment, $R^4$ and $R^5$ are both straight-chain aliphatic moieties having 8 carbon atoms.

A non-limiting example of a suitable commercial phenolic antioxidant is IRGANOX™ 1520 available from BASF, Ludwigshafen, Germany.

The phenolic antioxidant can be present in the crosslinkable polymeric composition in an amount of at least 0.01 wt %, at least 0.02 wt %, or at least 0.04 wt %, based on the entire weight of the silane-crosslinkable polymeric composition. In further embodiments, the phenolic antioxidant can be present in an amount ranging from 0.01 to 1.00 wt %, from 0.02 to 0.75 wt %, from 0.04 to 0.50 wt %, from 0.05 to 0.3 wt %, or from 0.1 to 0.25 wt %, based on the entire weight of the crosslinkable polymeric composition.

Ester-Functionalized Thioether

As noted above, the silane-crosslinkable polymeric composition optionally further comprises an ester-functionalized thioether. In various embodiments, the ester-functionalized thioether can have the following structure:

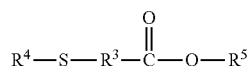

where $R^3$ is an alkylene radical (i.e., a bivalent group formed by removal of two hydrogen atoms from an alkane) having from 1 to 10 carbon atoms, and $R^4$ and $R^5$ are individually any aliphatic or aromatic radical, optionally containing one or more heteroatoms. Suitable alkylene radicals for $R^3$ include, but are not limited to, methylene (i.e., —$CH_2$—), ethylene (i.e., —$(CH_2)_2$—), propylene (i.e., —$(CH_2)_3$—), and butylene (i.e., —$(CH_2)_4$—). In an embodiment, $R^3$ is an alkylene radical having from 1 to 5 carbon atoms, or is an ethylene radical (i.e., —$(CH_2)_2$—). In various embodiments, $R^5$ can be an alkyl radical having from 4 to 20 carbon atoms, or from 10 to 18 carbon atoms. In other various embodiments, $R^5$ can comprise one or more additional ester and thioether groups and have from 10 to 80 carbon atoms, from 20 to 70 carbon atoms, or from 40 to 60 carbon atoms. In various embodiments, $R^4$ can be a straight-chain alkyl radical having from 4 to 20 carbon atoms, or from 10 to 18 carbon atoms. In one or more embodiments, $R^4$ can comprise a second ester group having a linking alkylene chain of from 1 to 10 carbon atoms, and an alkyl chain of from 4 to 20 carbon atoms, or from 10 to 18 carbon atoms.

In one or more embodiments, the ester-functionalized thioether can have a structure selected from the following structures (I)-(III):

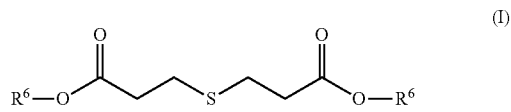

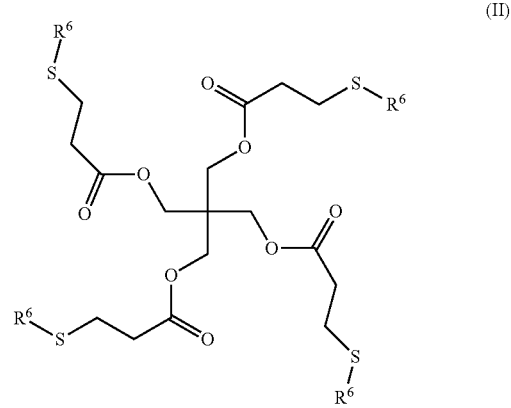

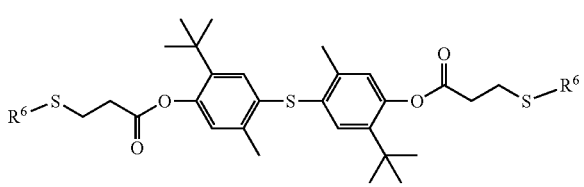

where $R^6$ is an alkyl radical having from 4 to 20 carbon atoms, or from 10 to 18 carbon atoms.

In one or more embodiments, the ester-functionalized thioether can be selected from the group consisting of distearyl thiodipropionate, dilauryl thiodipropionate, pentaerythritol tetrakis(β-laurylthiopropionate), thiobis-[2-tert-butyl-5-methyl-4,1-phenylene]bis [3-(dodecylthio)propionate], and combinations of two or more thereof.

The optional ester-functionalized thioether can be present in the crosslinkable polymeric composition in an amount of at least 0.01 wt %, at least 0.02 wt %, or at least 0.04 wt % based on the entire weight of the silane-crosslinkable polymeric composition. In further embodiments, the optional ester-functionalized thioether can be present in an amount ranging from 0.01 to 1.00 wt %, from 0.02 to 0.75 wt %, from 0.04 to 0.50 wt %, from 0.05 to 0.4 wt %, or from 0.1 to 0.3 wt %, based on the entire weight of the silane-crosslinkable polymeric composition.

Additives

The silane-crosslinkable polymeric compositions may contain other components, such as non-moisture crosslinkable polymers as matrix resins for masterbatches (e.g., LDPE, ethylene copolymers having one or more C3 or higher α-olefins or unsaturated esters, such as ethylene ethylacrylate copolymers, LLDPE, or elastomers), other non-moisture crosslinkable polymers for diluting or enhancing the properties of the crosslinkable polymeric composition (e.g., HDPE, LLDPE, or elastomers), additional antioxidants (e.g., secondary amine-based antioxidants such as NAUGARD™ 445), carbon black, metal deactivators, hydrolyzable free silanes as moisture scavengers (e.g., alkoxy silanes, such as octyl triethoxy silane), colorants, corrosion inhibitors, lubricants, anti-blocking agents, flame retardants, and processing aids. These other components or additives are used in manners and amounts known in the art. For example, the additives can be individually present in amount between 0.01 and 10 wt % based on the total weight of the polymeric composition.

Suitable additional antioxidants include (a) amine-based antioxidants, (b) phenolic antioxidants, (c) thio-based antioxidants, (d) and phosphate-based antioxidants. Examples of phenolic antioxidants include methyl-substituted phenols. Other phenols, having substituents with primary or secondary carbonyls, are suitable antioxidants. When additional antioxidants are present in the silane-crosslinkable polymeric composition, such antioxidants can be present in an amount greater than 0 but less than 75%, less than 50 wt %, less than 25 wt %, less than 10 wt %, less than 5 wt %, less than 1 wt %, or less than 0.1 wt %, based on the total weight of all antioxidants present in the silane-crosslinkable polymeric composition.

Suitable metal deactivators include hydrazine-based metal deactivators. A suitable metal deactivator is oxalyl bis(benzylidiene hydrazide) ("OABH").

In various embodiments, when non-moisture crosslinkable polymers are included, they can be present in an amount ranging from 1 to 20 wt %, when used for masterbatches, or in amounts ranging from 5 to 60 wt %, or from 5 to 50 wt %, when used for diluting or enhancing the properties of the system, based on the entire weight of the silane-crosslinkable polymeric composition. Carbon black, when employed, can be present in an amount ranging from 0.10 to 35 wt % based on the entire weight of the silane-crosslinkable polymeric composition. Additional antioxidants and metal deactivators can generally be present in individual amounts ranging from 0.01 to 0.50 wt %, from 0.01 to 0.20 wt %, or from 0.01 to 0.10 wt % based on the entire weight of the silane-crosslinkable polymeric composition. Moisture scavengers (e.g., octyl triethoxy silane) can be present in an amount ranging from 0.10 to 2 wt %, from 0.10 to 1.5 wt %, or from 0.10 to 1 wt %, based on the entire weight of the silane-crosslinkable polymeric composition. Finally, corrosion inhibitors can be present in amounts ranging from 0.00001 to 0.1 wt %, from 0.00001 to 0.001 wt %, or from 0.00001 to 0.0001 wt % based on the entire weight of the silane crosslinkable polymeric composition.

Compounding and Fabrication

Compounding of the polyolefin having hydrolyzable silane groups, the acidic silanol condensation catalyst, the phenolic antioxidant, the optional ester-functionalized thioether, and filler and additives, if any, can be performed by standard means known to those skilled in the art. Examples of compounding equipment are internal batch mixers, such as a Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, and extruded surface smoothness.

The components of the composition are typically mixed at a temperature and for a length of time sufficient to fully homogenize the mixture but insufficient to cause the material to gel. The catalyst is typically added to polyolefin polymer but it can be added before, with, or after the additives, if any. Typically, the components are mixed together in a melt-mixing device. The mixture is then shaped into the final article. The temperature of compounding and article fabrication should be above the melting point of the polyolefin having hydrolyzable silane groups but below about 250° C.

In some embodiments, either or both of the catalyst and the additives are added as a pre-mixed masterbatch. Such masterbatches are commonly formed by dispersing the catalyst and/or additives into an inert plastic resin matrix (e.g., a low-density polyethylene, a linear-low-density polyethylene, and/or an ethylene ethylacrylate copolymer). Masterbatches are conveniently formed by melt compounding methods.

In one embodiment, one or more of the components can be dried before compounding, or a mixture of components can be dried after compounding, to reduce or eliminate potential scorch that may be caused from moisture present in or associated with the component (e.g., filler). In one embodiment, crosslinkable polymeric compositions can be prepared in the absence of the acidic silanol condensation catalyst for extended shelf life, and the catalyst can be added as a final step in the preparation of a melt-shaped article.

Crosslinked Polymeric Composition

The crosslinking reaction typically takes place following the melt-blending and shaping, molding, or extrusion step. The moisture-induced crosslinking can occur in a vulcanization tube or ambient environment (optionally at elevated temperatures), with water permeating into the bulk polymer from the external environment (e.g., steam vulcanization tube, humid atmosphere, or from a water bath or "sauna"). Other approaches for in situ water generation for moisture induced crosslinking include (but are not limited to) those disclosed in U.S. Pat. Nos. 8,541,491, 8,460,770, 8,324,311, European Patent No. EP 2 195 380 B1, and European Patent No. EP 2 170 986 B1. Thus, moisture-induced crosslinking can even occur in a dry vulcanization tube that is conventionally used in making coated conductors with peroxide-crosslinked polyolefins. The fabricated article (such as a coated conductor) can continue to crosslink at ambient or room conditions of temperature (such as 23° C.) and humidity (such as 50 to 70 percent relative humidity).

Though not wishing to be bound by theory, it is believed that an unexpected synergistic effect occurs when the above-described phenolic antioxidant and the optional ester-functionalized thioether are employed together in forming the silane-crosslinked polymeric composition in an acid-containing system. For example, it is surprisingly found that the resulting crosslinked polymeric compositions containing both the phenolic antioxidant and the ester-functionalized thioether have significantly improved heat-aging properties compared to crosslinked compositions containing either the phenolic antioxidant or ester-functionalized thioether alone. This is evidenced by improved oxidative induction time ("OIT").

In various embodiments, when the phenolic antioxidant and ester-functionalized thioether are present in a combined amount of 0.22 wt % based on the entire weight of the crosslinked polymeric composition, the crosslinked polymeric composition can have an OIT of at least 40 minutes, at least 42 minutes, at least 45, or at least 47 minutes. Additionally, in such an embodiment, the crosslinked polymeric composition can have an OIT in the range of from 40 to 60 minutes, or in the range of from 45 to 50 minutes. Furthermore, in such an embodiment, the crosslinked polymeric composition can have an OIT that is at least 5%, at least 10%, at least 15%, or at least 20% greater than an identical comparative crosslinked polymeric composition, except that the comparative crosslinked polymeric composition contains 0.22 wt % of either the phenolic antioxidant or ester-functionalized thioether alone.

The synergism of these additives in moisture-cure systems containing an acid (e.g., in the form of an acidic condensation catalyst, discussed above) is surprising, since acid-catalyzed nucleophillic acyl substitutions of esters are well known.

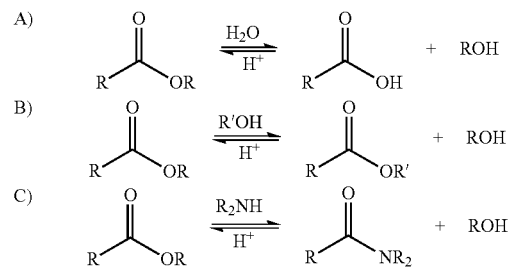

As shown in equation A), above, esters react with water in the presence of an acid to give carboxylic acid and alcohol (de-esterification reaction). Esters also readily undergo acid catalyzed transesterification upon reacting with alcohols such as methanol (equation B), which is a reaction byproduct of the silane-crosslinking reaction. In addition, amine-based antioxidant can be included as an additional antioxidant in the silane-crosslinkable polymeric compositions. Esters react with amines in the presence of an acid to form amides (equation C). The positive effect of the optional amine-based antioxidant in these systems is unexpected. It is widely reported in the polymer stabilization literature that amine-based antioxidants are antagonistic toward sulfur-based antioxidants on account of various acid-base reactions among key intermediates involved in the stabilization process. Despite these facile acid-catalyzed reactions that readily affect the ester-functionalized thioethers, there is a synergistic effect on the heat aging properties when these are used in combination with phenolic antioxidants in the acid-catalyzed moisture cure formulations. In fact, European Patent No. EP 1254923 B1 teaches against the use of ester-containing antioxidants in moisture-cure formulations. It also teaches against the use of amines.

Coated Conductor

A cable containing an insulation layer comprising the crosslinkable or crosslinked polymeric composition can be prepared with various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1.

In wire coating where the polymeric insulation is crosslinked after extrusion, the cable can be placed into a moisture-curing environment, such as a water bath, sauna, or even ambient environment conditions to effect moisture crosslinking. Such conditions in a water bath could include temperatures ranging from about 20° C. up to about 90° C. Sauna conditions could employ temperatures up to 100° C. or even higher. In alternate embodiments, the cable can pass into a heated vulcanization zone downstream of the extrusion die. The heated cure zone can be maintained at a temperature in the range of 150 to 500° C., or in the range of 170 to 350° C. The heated zone can be heated by pressurized steam or inductively heated pressurized nitrogen gas.

Definitions

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

"Wire" means a single strand of conductive metal, e.g., copper or aluminum, or a single strand of optical fiber.

"Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496,629 and 6,714,707.

"Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

"Crosslinkable" and like terms mean that the polymer is not cured or crosslinked and has not been subjected to or exposed to treatment that has induced substantial crosslinking, although the polymer comprises additive(s) or functionality that will cause or promote substantial crosslinking upon subjection or exposure to such treatment (e.g., exposure to water).

"Polymer" means a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers (three different monomers), tetrapolymers (four different monomers), etc.

"Homopolymer" denotes a polymer comprising repeating units derived from a single monomer type, but does not exclude residual amounts of other components used in preparing the homopolymer, such as chain transfer agents.

Test Methods

Density

Density is determined according to ASTM D 792.

Melt Index

Melt index, or $I_2$, is measured in accordance by ASTM D 1238, condition 190° C./2.16 kg, and is reported in grams eluted per 10 minutes.

Oxidative Induction Time

Measure oxidative induction time ("OIT") at 200° C. on a differential scanning calorimeter ("DSC") according to ASTM method D 3895. A TA Instruments DSC Q1000 is employed with a run program according to the following: equilibrate at 60° C. for 5 minutes under nitrogen gas before ramping to 200° C. at a rate of 10° C./minute, hold the temperature at 200° C. for 5 minutes, switch to oxygen gas, hold the temperature at 200° C. for 100 minutes, and once the sample has oxidized, return the test chamber to ambient conditions Heat Aging Without Conductor Remove conductors from the crosslinked samples and place the samples in an oven at 135° C. for 168 hours per International Electrotechnical Commission ("IEC") standard 60502. At the end of the aging period, the samples are taken out of the oven and allowed to cool down under ambient conditions for a minimum of 16 hours. Tensile strength and elongation of the aged samples are then compared to those of unaged samples. As per IEC-60502, the samples pass the test if the difference between the tensile strength and elongation of the aged and unaged samples is less than 25%. It should be noted that the extent of curing of the samples prior to aging plays a significant role in this test. If the sample is not fully cured, it will simultaneously undergo curing and aging which would make the values of elongation post aging significantly different from the unaged sample. Due to this crosslinking effect, OIT tests are generally better indicators of the heat-aging performance of the sample. For this reason, the results of this test are displayed as pass or fail in the following examples.

Hot Creep

Measure hot creep according to the method of IEC-60502. The conductor is removed from a 30-mil wall wire, and a 4-inch specimen of the insulation is cut out. A one-inch test area is marked in the middle, and the specimen is placed in a 200° C. oven for 15 minutes under 20 N/cm² load. The percent change in length of the test area after 15 minutes is reported as the hot creep of the sample.

Tensile Strength and Elongation

Measure mechanical properties on fully crosslinked wire samples on an Instron machine. Remove the conductor from 5-inch samples. Test samples at 10 inches/minute per IEC-60502.

Materials

The following materials are employed in the Examples, below.

A reactor copolymer of ethylene and vinyl trimethoxysilane ("VTMS"), Dow SI-LINK™ AC DFDA-5451, is employed having a VTMS content of 1.5 wt %, a melt index of 1.5 g/10 minutes, and a density of 0.92 g/mL. Octyl triethoxysilane (OTES), which is available as PROSIL™ 9202 from SiVance LLC (now part of Milliken), is soaked into the ethylene/VTMS copolymer at a loading of 0.5 wt % in a Henschel blender.

The ethylene ethylacrylate ("EEA") has an ethylacrylate content of 15 wt %, a density of 0.926 g/cm³, and a melt index of 1.3 g/10 minutes. The EEA is commercially available under the trade name AMPLIFY™ EA 100 Functional Polymer from The Dow Chemical Company.

The linear low-density polyethylene ("LLDPE") has a density of 0.92 g/cm³ and a melt index of 0.65 g/10 minutes.

The sulfonic acid is a proprietary naphthalene-based sulfonic acid. This sulfonic acid is commercially available under the trade name NACURE™ CD-2180 from King Industries, Norwalk, Conn., USA.

Oxalyl bis(benzylidenehydrazide) ("OABH") is commercially available from FutureFuel Chemical Company.

NAUGARD™ 445 is an amine-based antioxidant having the composition 4,4'-di(dimethylbenzyl)diphenylamine (CAS 10081-67-1), which is available from Addivant, Middlebury, Conn., USA.

LOWINOX™ 221 B46 is a phenolic antioxidant having the composition 2,2'-isobutylidene bis(4,6-dimethyl-phenol), which is available from Addivant, Middlebury, Conn., USA.

IRGANOX™ 1520 is a phenolic antioxidant having the composition 2-methyl-4,6-bis(octylsulfanylmethyl)phenol, which is available from BASF, Ludwigshafen, Germany.

Distearyl thiodipropionate ("DSTDP") is commercially available as ARENOX™ DS from Reagens U.S.A. Inc.

Examples

Prepare three Samples (S1-S3) and three Comparative Samples (CS1-CS3) according to the formulas provided below in Table 1. In each Sample and Comparative Sample, 95 wt % of the OTES-soaked VTMS-containing copolymer is mixed with 5 wt % of a masterbatch containing the rest of the additives in a wireline extruder to form 30-mil wall wires with 14 AWG conductor. The additive masterbatch is prepared by melt mixing EEA and LLDPE resins with the antioxidant(s), sulfonic acid, and other additives in a Brabender® bowl mixer at 135° C. for three minutes at 40 rpm. Mixing of the VTMS-containing copolymer with the additive masterbatch is accomplished by dry blending pellets and extruding on a 0.75", 25 L/D single-screw wireline extruder with a die temperature of 180° C. Wires are then placed in a 90° C. water bath for three hours to ensure full crosslinking.

TABLE 1

Compositions of CS1-CS3 and S1-S3

| Component (wt %) | CS1 | CS2 | CS3 | S1 | S2 | S3 |
|---|---|---|---|---|---|---|
| Ethylene/VTMS Copolymer | 94.53 | 94.53 | 94.53 | 94.53 | 94.40 | 94.53 |
| Octyl triethoxysilane | 0.48 | 0.48 | 0.48 | 0.48 | 0.48 | 0.48 |
| EEA | 2.38 | 2.27 | 2.27 | 2.27 | 2.27 | 2.27 |
| LLDPE | 2.38 | 2.27 | 2.27 | 2.27 | 2.27 | 2.27 |
| NACURE ™ CD-2180 | 0.16 | 0.16 | 0.16 | 0.16 | 0.16 | 0.16 |
| OABH | 0.04 | 0.04 | 0.04 | 0.04 | 0.04 | 0.04 |
| NAUGARD ™ 445 | 0.03 | 0.03 | 0.03 | 0.03 | 0.03 | 0.03 |
| LOWINOX ™ 22IB46 | — | 0.22 | — | — | — | — |
| IRGANOX ™ 1520 | — | — | — | 0.22 | 0.35 | 0.11 |
| DSTDP | — | — | 0.22 | — | — | 0.11 |
| TOTAL: | 100 | 100 | 100 | 100 | 100 | 100 |

Next, analyze CS1-CS3 and S1-S3 for their properties according to the Test Methods provided above. The results are provided in Table 2, below:

TABLE 2

Properties of CS1-CS4 and S1-S4

| Property | CS1 | CS2 | CS3 | S1 | S2 | S3 |
|---|---|---|---|---|---|---|
| Hot Creep (%) | 25.6 | 24.0 | 22.7 | 26.4 | 18.9 | 22.4 |
| OIT on Wire (min.) | 8.2 | 19.0 | 19.8 | 38.9 | 78.8 | 47.0 |
| Tensile Strength (psi) | 1811 | 2360 | 2758 | 2419 | 2650 | 2197 |
| Ultimate Elongation (%) | 219 | 258 | 330 | 263 | 291 | 256 |
| T&E Retention | Pass | Pass | Pass | Pass | Pass | Pass |

As shown in Table 2, all samples are well cured, showing hot creep less than 30%. All samples also pass the tensile and elongation heat aging requirement. However, at the same loading of IRGANOX™ 1520, samples gives much better heat aging performance than LOWINOX™ 22 IB46 as indicated by the OIT. Although IRGANOX™ 1520 and LOWINOX™ 22 IB46 are in the same phenolic family, IRGANOX™ 1520 works surprisingly better than LOWINOX™ 22 IB46 as an antioxidant in this application. Also surprisingly, addition of an ester-based antioxidant (DSTDP) further improves the heat-aging performance for moisture-cure, low-voltage wires. This is particularly surprising given the expected negative interaction between the acidic condensation catalyst and an ester-containing antioxidant. With an IRGANOX™ 1520 loading of 0.11 wt % and DSTDP loading of 0.11 wt %, S3 has much higher OIT than would be expected from the OIT data from formulations with 0.22 wt % of the individual antioxidants (i.e., CS3 and S1).

The invention claimed is:

1. A silane-crosslinkable polymeric composition, comprising:
   a polyolefin having hydrolyzable silane groups;
   an acidic silanol condensation catalyst; and
   a phenolic antioxidant having the following structure:

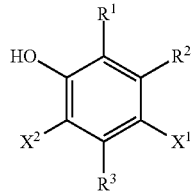

wherein $X^1$ and $X^2$ are individual sulfur-containing radicals,
   wherein $R^1$, $R^2$, and $R^3$ are individually hydrogen atoms or hydrocarbyl radicals optionally containing one or more heteroatoms,
   further comprising an ester-functionalized thioether.

2. The silane-crosslinkable polymeric composition of claim 1, wherein said phenolic antioxidant has the following structure:

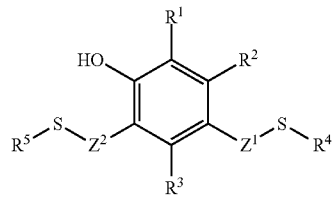

wherein $R^1$, $R^2$, and $R^3$, are individually hydrogen atoms or straight-chain alkyl groups having from 1 to 4 carbon atoms, wherein $Z^1$ and $Z^2$ are optionally present individual divalent hydrocarbyl radicals, wherein $R^4$ and $R^5$ are individual hydrocarbyl radicals optionally containing one or more heteroatoms.

3. The silane-crosslinkable polymeric composition of claim 1, wherein said phenolic antioxidant has the following structure:

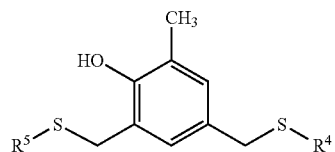

wherein $R^4$ and $R^5$ are individual straight-chain aliphatic moieties having from 4 to 12 carbon atoms.

4. The silane-crosslinkable polymeric composition of claim 3, wherein $R^4$ and $R^5$ are straight-chain aliphatic moieties having 8 carbon atoms.

5. The silane-crosslinkable polymeric composition of claim 1, wherein said ester-functionalized thioether has the following structure:

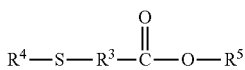

wherein $R^3$ is an alkylene radical having from 1 to 10 carbon atoms, $R^4$ and $R^5$ are individually any aliphatic or aromatic radical, optionally containing one or more heteroatoms.

6. The silane-crosslinkable polymeric composition of claim 1, wherein said ester-functionalized thioether has a structure selected from the following structures (I)-(III):

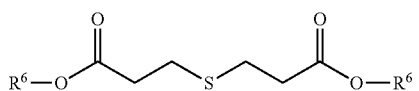
(I)

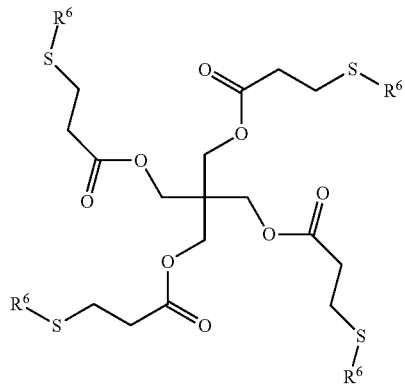
(II)

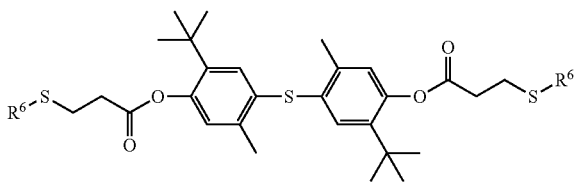
(III)

wherein $R^6$ is an alkyl radical having from 4 to 20 carbon atoms.

7. The silane-crosslinkable polymeric composition of claim 1, wherein said ester-functionalized thioether is selected from the group consisting of distearyl thiodipropionate, dilauryl thiodipropionate, pentaerythritol tetrakis(β-laurylthiopropionate), thiobis-[2-tert-butyl-5-methyl-4,1-phenylene] bis [3-(dodecylthio)propionate], and combinations of two or more thereof.

8. The silane-crosslinkable polymeric composition of claim 1, wherein said polyolefin having hydrolyzable silane groups is selected from the group consisting of (i) an interpolymer of ethylene and a hydrolyzable silane, (ii) an interpolymer of ethylene, one or more $C_3$ or higher α-olefins and/or unsaturated esters, and a hydrolyzable silane, (iii) a homopolymer of ethylene having a hydrolyzable silane grafted to its backbone, and (iv) an interpolymer of ethylene and one or more $C_3$ or higher α-olefins and/or unsaturated esters, such interpolymer having a hydrolyzable silane grafted to its backbone.

9. A coated conductor, comprising:
(a) conductor; and
(b) a crosslinked polymeric composition prepared from the silane-crosslinkable polymeric composition of claim 1,
wherein said crosslinked polymeric composition surrounds at least a portion of said conductor.

\* \* \* \* \*